(12) United States Patent
Nikolova et al.

(10) Patent No.: US 7,756,021 B2
(45) Date of Patent: Jul. 13, 2010

(54) METHOD FOR FINDING MINIMAL COST PATHS UNDER UNCERTAINTY

(75) Inventors: Evdokia V. Nikolova, Somerville, MA (US); Matthew E. Brand, Newtonville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 793 days.

(21) Appl. No.: 11/493,198

(22) Filed: Jul. 26, 2006

(65) Prior Publication Data

US 2008/0025222 A1   Jan. 31, 2008

(51) Int. Cl.
*H04J 1/16* (2006.01)
*H04J 3/14* (2006.01)
(52) U.S. Cl. .................................. 370/229; 709/238
(58) Field of Classification Search ............... 370/229; 709/238
See application file for complete search history.

(56) References Cited

U.S. PATENT DOCUMENTS

| | | | |
|---|---|---|---|
| 6,976,087 B1 * | 12/2005 | Westfall et al. | 709/238 |
| 2005/0084082 A1 * | 4/2005 | Horvitz et al. | 379/114.06 |
| 2005/0119928 A1 * | 6/2005 | Deitrich et al. | 705/9 |
| 2006/0013129 A1 * | 1/2006 | Sterenson et al. | 370/229 |
| 2006/0015291 A1 * | 1/2006 | Parks et al. | 702/179 |
| 2007/0239348 A1 * | 10/2007 | Cheung | 701/200 |

* cited by examiner

*Primary Examiner*—William Trost, IV
*Assistant Examiner*—Kyle C Kasparek
(74) *Attorney, Agent, or Firm*—Dirk Brinkman; Gene Vinokur

(57) ABSTRACT

A computer implemented method finds a path having a minimal expected cost through a network of nodes connected by arcs, in which the path is from a source node to a destination node, and in which a traversal time for traversing each arc is a random variable. An expected cost of traversing each possible path from the source node to the destination node is determined as an average value of a nonlinear cost function applied to each possible total travel time for traversing the path. The expected cost is weighted according to a probability of each possible total travel time. For each node in the network and for each possible time to start, a particular path from the source node to the node having a minimal expected cost and an optimal time to start on that path is determined.

9 Claims, 4 Drawing Sheets

100

```
// Initialize paths out of source S with mean 1
path variance $\Phi(S,0) := 0$; predecessor node $\pi(S,0) := S$
for each vertex $v$
    if $v$ is a neighbor of $S$ and $\mu_{sv} = 1$
        $\Phi(v,0) := \sigma_{sv}$; $\pi(v,0) := S$
    else
        $\Phi(v,0) := null$ ; $\pi(v,0) := null$ // Fill in the rest of the table
for $m = 1$ to $M$
    for each vertex $v$ with neighbors $v'$
        $\Phi(v,m) := \min_{v' \sim v} [\Phi(v', m - \mu_{v'v}) + \sigma^2_{v'v}]$
        $\pi(v,m) := arg\min_{v' \sim v} [\Phi(v', m - \mu_{v'v}) + \sigma^2_{v'v}]$ // Find the lowest cost path from $S$ to $T$ at departure time $t$
$m_{opt} = argmin_{m \in \{0,\ldots,M\}} \{(t+m)^2 + \Phi(T,m)\}$
$\pi_{opt} = \pi(T, m_{opt})$
$EC_{min}(t) = (t + m_{opt})^2 + \Phi(T, m_{opt})$
```

*Fig. 3*

METHOD FOR FINDING MINIMAL COST PATHS UNDER UNCERTAINTY

FIELD OF THE INVENTION

The invention relates generally to finding minimal cost paths, and more particularly to finding minimal expected cost paths using a stochastic graph.

BACKGROUND OF THE INVENTION

Finding minimal cost paths is important in many practical logistical applications including transportation, communication routing, and robot planning. The problem is to find a path from a source to a destination under some constraint, for example, a best path to the airport such that one neither arrives too early nor misses a deadline.

The invention is concerned with problems that can be modeled as a stochastic graph. A stochastic graph includes nodes connected by arcs. The arcs represent the paths that can form a potential minimal expected cost path, and the nodes are intermediate points where alternative subpaths can be selected. In a stochastic graph, a cost of traversing an arc is neither fixed nor predictable. Instead the cost is a random variable drawn from a probability distribution function associated with the arc. Typically, the random variable represents a 'length' of the arc, the time to traverse the arc, a financial cost, or a physical quantity. Almost all real-world planning and logistic problems have stochastic costs.

There are adaptive and non-adaptive approaches to optimal traversals of the graph. An adaptive method gives a policy in which one receives new information upon arriving at each node and that information is used to select the next arc. This new information makes the problem much easier. For this reason, most of the prior art revolves around adaptive methods. When new information is not forthcoming at every node, one must use non-adaptive methods to select chains of arcs that form paths. In the stochastic, setting this is generally a much harder problem.

Traditionally, the work on path planning in stochastic graphs has focused on a notion of shortest paths according to some expectation, Papadimitriou, C. H. and Yannakakis, M., "Shortest paths without a map," Theoretical Determiner Science 84: pp. 127-150, and Bertsekas, D. P. and Tsitsiklis, J. N., "An analysis of stochastic shortest path problems," Math. Oper. Res. 16 (3): pp. 580-595, 1991.

Some models associate a cumulative cost with each node. The cumulative cost depends on the time it takes to traverse the arcs to reach the node. By storing many such costs from many paths to each node, one can approximate the uncertainty in the problem, Chabini, I., "Algorithms for k-Shortest Paths and Other Routing Problems in Time-Dependent Networks," Transportation Research Part B: Methodological, 2002, and Miller-Hooks, E. D., and Mahmassani, H. S., "Least Expected Time Paths in Stochastic, Time-Varying Transportation Networks," Transportation Science, 34, pp. 198-215, 2000. Such approaches generally suffer exponential running time, unbounded approximation error, or both.

However, there has been little work on decision theoretic models, which directly incorporate uncertainty, and find the minimal expected cost path on the basis of a comprehensive measure of user utility and all available distributional information of the stochastic arc lengths. In that setting, the utility or cost of a path can be an arbitrary function of its total length, and both are random variables. To make optimal decisions, one must integrate out the randomness and evaluate paths according to their expected cost, which may be quite unrelated to their expected lengths.

Most prior art methods minimize an expected length of paths from the source to the destination, or a combination of expected lengths and expected costs such as bicriterion problems, J. Mote, I. Murthy, and D. Olson, "A parametric approach to solving bicriterion shortest path problems," European Journal of Operational Research, 53:81-92, 1991, and S. Pallottino and M. G. Scutella, "Shortest path processes in transportation models: Classical and innovative aspects," Technical Report TR-97-06, Universita di Pisa Dipartimento di Informatica, 1997.

Some methods use a decision theoretic model, R. P. Loui, "Optimal paths in graphs with stochastic or multi-dimensional weights," Communications of the ACM, 26:670-676, 1983. However, Loui only considers monotone increasing costs. These are arguably easier because that model admits exact efficient solutions for special cases, such as linear and exponential objective functions.

An adaptive method for finding minimal cost paths that maximizes the probability of arriving before the deadline is described by Y. Fan, R. Kalaba, and I. J. E. Moore, "Arriving on time," Journal of Optimization Theory and Applications, Vol. 127, No. 3, pp. 485-496, December 2005, Gao, S. and Chabini, I., "Optimal Routing Policy Problems in Stochastic Time-Dependent Networks," Proceedings of the IEEE 5th International Conference on Intelligent, Transportation Systems, pp. 549-559, 2002, and Boyan, J. and Mitzenmacher, M., "Improved Results for Route Planning in Stochastic Transportation Networks," ACM-SIAM Symposium on Discrete Algorithms, 2001.

Few methods consider minimizing a nonlinear or non-monotonic function of the length and only give approximate heuristic processes.

Mirchandani and Soroush give exponential processes and heuristics for quadratic utility functions, P. Mirchandani and H. Soroush, "Optimal paths in probabilistic networks: a case with temporary preferences," Determiners and Operations Research, 12(4):365-381, 1985.

SUMMARY OF THE INVENTION

The embodiments of the invention provide a method for finding a minimal expected cost path in the presence of uncertainty. The embodiments use a decision theoretic model for defining the minimal expected cost path. Paths from a source to a destination are represented by a graph of nodes connected by arcs. Times to traverse a particular arc between two nodes are expressed as an independent probability distribution function.

In particular, one embodiment of the invention provides a method for finding a path having a minimal expected cost through a network of nodes connected by arcs, in which the path is from a source node to a destination node, and in which a traversal time for traversing each arc is a random variable.

An expected cost of traversing each possible path from the source node to the destination node is determined as an average value of a nonlinear cost function applied to each possible total travel time for traversing the path.

The expected cost is weighted according to a probability of each possible total travel time. For each node in the network and for each possible time to start, a particular path from the source node to the node having a minimal expected cost and an optimal time to start on that path is determined.

BRIEF DESCRIPTION OF THE DRAWINGS

FIG. 3 is a pseudo code of a method for finding a minimal path for a given starting time according to an embodiment of the invention.

DETAILED DESCRIPTION OF THE PREFERRED EMBODIMENT

Figure 1:
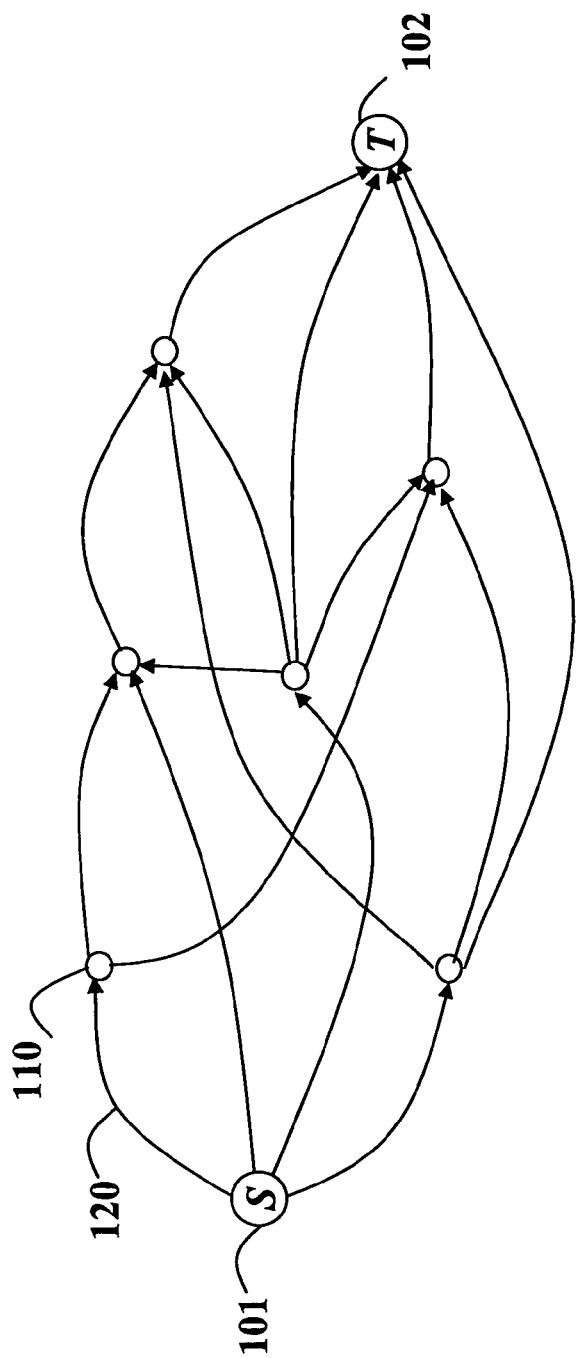
FIG. 1 is graph representing paths from a source to a destination according to an embodiment of the invention.

FIG. 1 shows a graph 100 representing paths from a source (S) 101 to a destination (T) 102 according to our invention. The graph includes nodes 110 and arcs 120 connecting the nodes. The arcs represent subpaths. Formally, the graph 100 is G=(V, E), with |V|=n nodes and |E|=m arcs. It should be understood that for real world applications the number of arcs can be in the thousands.

Each arc $E_i$ 120 has an associated independent random variable expressed as a probability distribution function (pdf) $f_e(.)$. The pdf can be expressed in terms of its mean $\mu$ and its variance a $\sigma^2$. The exact meaning of the random variable depends on a particular application, for example, the amount of time required to traverse the arc. The travel times on different arcs are independent of each other.

It should be understood that the graph and all associated constants, variables, tables, etc., can be stored in a memory of a computer system, which also executes the methods according to the embodiments of the invention.

We have a constraint t. The constraint can be expressed as a desired arrival or deadline time $t_0$. It should be understood, that constraints on variables other than total travel time can be used for other applications. The penalty for arriving at some time t relative to a deadline is denoted by a penalty function C(t), where the variable t is positive for late arrivals and negative for early arrivals, and zero for arriving exactly on time.

Therefore, we convolve (integrate) a nonlinear cost function, as described below, with the probability distribution functions associated with the arcs representing the subpaths. The result of the convolution is an expected cost function. Usually, the expected cost function has several terms. One term relates to the mean travel time of the subpath, and term relates to the variance of travel time on the subpath. We discretize the possible values of all but one of those terms of the expected cost function, and use a multi-dimensional grid of the discretized values as the indices to tables described below.

If a current arc along a path to the destination is e, then an expected cost EC(t) for starting to traverse this arc, starting at time t is given by a convolution $$EC(t) = \int_0^\infty f_e(y)C(t+y)dy,$$

where the random variable y of the pdf is the time required to traverse the arc.

Because the arc travel times are independent of each other, an expected cost of traversing a path $P=\{e_1, \ldots, e_r\}$ with r arcs and a starting at time t is $$EC_p(t) = \int_0^\infty \ldots \int_0^\infty [f_{e_1}(y_1) \ldots f_{e_r}(y_r)C(t+y_1+\ldots+y_r)]dy_1 \ldots dy_r. \quad (1)$$

We now distinguish two different problems:
1. Find the minimal cost path P and the optimal starting time t:

$$\min_{P,t} EC_p(t). \quad (2)$$

2. Find the minimal path for a given starting time.

Figure 2:
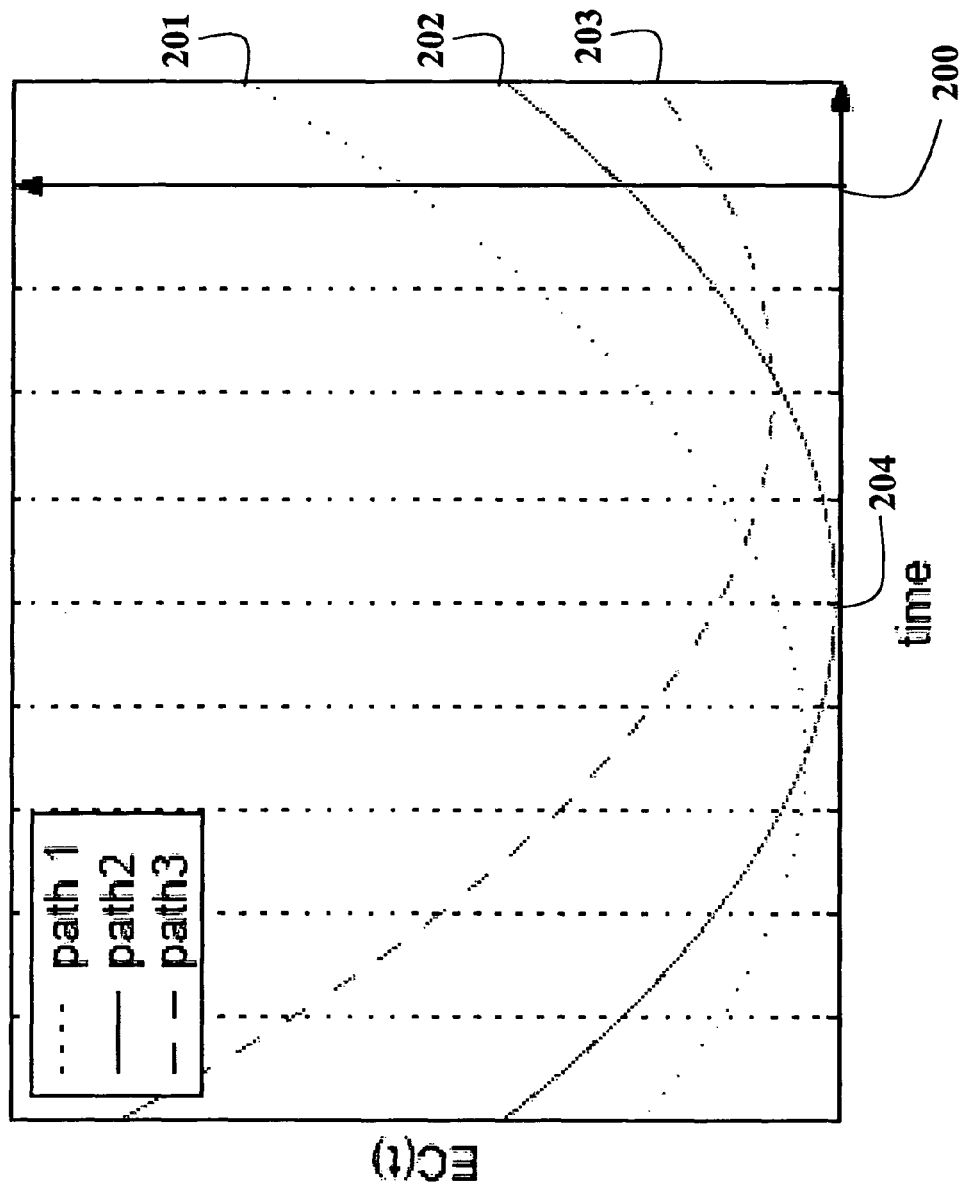
FIG. 2 are graphs of expected cost for three paths as a function of starting time.

FIG. 2 shows expected cost curves for three paths 201, 202 and 202 as a function of starting time. Each path has an associated expected cost EC(t), which takes as argument the starting time t. If we start at the time marked by the vertical arrow 200, then path 3 is optimal. However, a globally optimal starting time is located at the minimum 204 of lowest cost curve of path 202. Note that the cost of each path can be minimized over a different time intervals of starting times. The global minimum of the minimal envelope of all such cost curves indexes the optimal time to start.

Determining a Cost of a Single Path

In general, the expected cost function in Equation (1) may be impossible to determine in a closed form. Therefore, we focus on two families of cost functions for which the integral can be determined exactly, polynomials and exponentials.

Our example application is planning a trip to the airport. We assess a high cost for arriving late (missing the plane), a smaller cost for arriving early (wasting time), and a zero cost for arriving exactly on time. This motivates an asymmetric nonlinear nonmonotonic cost function. We may prefer a convex cost function so that there is a well-defined optimal time to start traveling (assuming unimodal travel-time distributions). Furthermore, we may prefer a path that is not highly variable, so that the probability of a 'surprise' is small. This recommends a fast-growing cost function. All of these criteria can be folded into a family of cost functions described below.

Quadratic Cost

If the penalty of reaching the destination at time t is $C(t)=t^2$ and the path from the source to the destination consists of a single arc with a random travel time Y, expressed by the probability distribution function (pdf) $f(.)$, a mean $\mu$ and a variance $\sigma^2$, then the expected cost of starting from the source at time t is $$EC(t) = \int_0^\infty f(y)(t+y)^2 dy$$
$$= t^2 + 2tE[Y] + E[Y^2]$$
$$= (t+\mu)^2 + \sigma^2.$$

If the path has r arcs with random travel times $Y_i$, then iterating the above calculation r times gives $$EC(t) = \int_0^\infty \ldots \int_0^\infty [f_1(y_1) \ldots f_r(y_r)C(t+y_1+\ldots+y_r)]dy_1 \ldots dy_r$$

$$= \left(t + \sum_{i=1}^{r} \mu_i\right)^2 + \sum_{i=1}^{r} \sigma_i^2.$$

Therefore, the cost of a path is minimized at a starting time $$t = -\sum_{i}^{r} \mu_i,$$

which is the negative average travel time for that path. At this optimum, the expected cost value is the variance of the path, $$EC_{min} = \sum_{i=1}^{r} \sigma_i^2.$$

Quadratic Plus Exponential Cost

The quadratic cost function is not realistic because it assigns the same penalty to being early or late. This only leads to preferring the path whose total travel time distribution has a minimal variance, without any care for the average travel time. To correct this, we augment the quadratic cost function with an exponential term. The augmented cost function assigns a higher penalty for being late. Consider a penalty function $C(t)=t^2+e^{kt}$, where again t is the time of arrival with respect to a deadline at time $t_0$ and k is a parameter that determines a weight of the penalty for being late. The sign of the parameter k can be negative if one is more averse to arriving early than being late.

In this case, we still have a closed form expression for the expected cost of a path. For a path of one arc and with the pdf $f(Y)$, we obtain $$EC(t) = \int_0^\infty f(y)[(t+y)^2 + e^{k(t+y)}]dy$$
$$= (t+\mu)^2 + \sigma^2 + e^{kt}E(e^{kY}),$$

where $E[e^{kY}]$ is the moment-generating function of the distribution of Y. When the path consists of r arcs with probability distribution $f_i(Y_i)$, the expected cost of starting at time t is $$EC(t) = \left(t + \sum_{i=1}^{r} \mu_i\right)^2 + \sum_{i=1}^{r} \sigma_i^2 + e^{kt} \prod_{i=1}^{r} E[e^{kY_i}].$$

Travel Time Distributions

Traditionally, the travel times on the arcs have been modeled by normal distributions. For a normally distributed random variable, the expected cost of a path with r independent normally distributed arc travel times is $$EC(t) = \left(t + \sum_{i=1}^{r} \mu_i\right)^2 + \sum_{i=1}^{r} \sigma_i^2 + e^{kt} + e^{k\sum_i (\mu_i + k\sigma_i^2/2)}. \quad (3)$$

However, the normal distribution is unrealistic because that distribution assigns positive probability to negative travel times. A more appropriate distribution is obtained by observing that in ordinary (collision-free) traffic, arrivals at any particular landmark can be viewed as a Poisson process, which implies that travel times are gamma distributed, see Fan et al, above, incorporated herein by reference.

For a gamma distribution, the time to traverse an arc e is distributed as $\gamma(a_e, b_e)$, with a shape parameter $a_e$, and a width parameter $b_e$. The density of the gamma distribution is given by $$\gamma(a, b, y) = \frac{y^{a-1} e^{-y/b}}{b^a \Gamma(a)},$$

where $$\Gamma(a) = \int_0^\infty t^{a-1} e^{-t} dt$$

is the gamma function.

The gamma distribution has strictly nonnegative support. Additionally, we can specify a minimal travel time by shifting y. To simplify this description, we use unshifted distributions. The generalization to shifted distributions is straightforward. For a gamma random variable $$Y, E[e^{kY}] = (1-kb)^{-a}.$$

Therefore, the expected cost of a path with independent gamma distributed arc travel times is given by $$\left(t + \sum_{i=1}^{r} a_i b_i\right)^2 + \sum_{i=1}^{r} a_i b_i^2 + e^{kt} \left[\prod_{i=1}^{r} (1 - kb_i)^{-a_i}\right], \quad (4)$$

which no longer has a simple analytic expression for the minimal cost.

Minimal Cost Path and Optimal Starting Time

We want determine jointly a minimal cost path for an optimal starting time. When $C(t)=t^2$, the expected cost of a single path is minimized at a starting time $$t = -\sum_{i}^{r} \mu_i,$$

which is the negative average travel time for the path. At the optimum starting time, the expected cost is the sum of the variances over the individual arcs $$\overline{EC}_{min} = \sum_{i=1}^{r} \sigma_i^2.$$

Therefore, we can find the minimal cost path, i.e., the path with the smallest total variance, with an application of a minimal cost path process, where each arc e has an associated variance $\sigma_e^2$. Consequently, the optimal starting time is be given by the mean travel time of that path. Thus, the minimal cast path and optimal starting time can be determined in the case of a quadratic cost. The second problem of finding the minimal cost path for a given starting time does not benefit from the simple form of the expected cost function, and this problem is NP-hard.

If we add an exponential penalty for being late by taking $C(t)=t^2+e^t$, then the expected cost for a path still has a simple closed form, given by Equation (4). However, we lose the separability property of the quadratic cost functions, which otherwise allows for a dynamic programming solution.

Finding the minimal cost path and the optimal starting time under quadratic cost and general distributions can be solved exactly with a deterministic minimal cost path process, and can be solved exactly under quadratic plus exponential cost and normal distributions with a deterministic minimal cost path process.

The same cost function with normally distributed arc travel times admits dynamic programming. The expected cost of starting on path P at time t given by Equation (3), can be written as $$EC(\tilde{t})=\tilde{t}^2+s+e^{kt}e^{k^2s/2}, \quad (5)$$

after changing variables according to $$\tilde{t} = t + \sum_{e \in P} \mu_e, \text{ and}$$

$$s = \sum_{e \in P} \sigma_e^2.$$

In particular, a path with a higher total variance has an expected cost function strictly above that of a path with a lower variance. Hence, the path with a lowest variance has a lowest minimal expected cost. We can find that path via any minimal cost path process with arc weights equal to the variances. Thus, when travel times are normally distributed, both the quadratic and quadratic plus exponential cost functions select the same minimal cost path, although the optimal starting time is naturally earlier under the second family of cost functions.

Minimal Cost Paths with Given Starting Time

We are also interested in a minimal cost path to the destination for a given starting time from the source, while planning ahead of time. While en route, it is natural to perform updates given that current traffic conditions may have changed since starting on the path. Now, we are really posing a new problem to find the path with the minimal expected cost, $EC(t_{starting})$, for a given departure time $t_{starting}$. This may appear as a simpler than the one for finding the minimal cost path and optimal starting time. However, this problem turns out to be NP-hard for a very broad class of cost functions.

We know that finding minimal cost paths with a given starting time is hard to approximate within a constant factor. This is similar to finding a longest path. When we remove the restriction to simple paths, we can give a pseudopolynomial dynamic programming process, which depends polynomially on the largest mean travel time of a path M, or equivalently on the maximum expected travel time of an arc.

For real world applications such as traveling by a vehicle, M is likely a polynomial in the size of the graph. Hence, this process is efficient in practice, and significantly better than the prior art processes based on exhaustive search, see Mirchandani et al. above. We describe methods for the quadratic and quadratic plus exponential cost function families under general travel time distributions. We derived simple closed form expressions. However, our methods can readily extend to general polynomials and polynomials plus exponentials.

Quadratic Costs

Consider the case of quadratic cost, where the expected cost of a path P is determined by a nonlinear cost function $$ECp(t) = \left(t - \sum_{e \in P} \mu_e\right)^2 + \sum_{e \in P} \sigma_e^2.$$

We are interested in finding the path with the minimal expected cost $EC_P(t)$, for a given starting time t. The predecessor of node v on a path from the source S to node v, with a mean μ and a smallest variance, is denoted by $\pi(v, \mu)$. The variance of this path is by $\Phi(v, \mu)$. We associated and maintain for each node, a multi-dimensional prefix table. For example, the table is stored in a memory. The multi-dimensional prefix table indicates, for each combination of discrete values of the indexing terms, a minimal penalty subpath to the node and a penalty value. The multi-dimensional prefix table is indexed by discretized values of the expected cost function.

We can find $\pi(v, m)$ and $\Phi(v, m)$ for all v and all m=0, ..., M, by considering the neighbor nodes v' of node v, and selecting the predecessor node leading to a smallest variance of the path from the source S to node v:

$$\Phi(v, m) = \min_{v' \sim v}[\Phi(v', m - \mu_{v'v}) + \sigma_{v'v}^2],$$

$$\pi(v, m) = \mathrm{argmin}[\Phi(v', m - \mu_{v'v}) + \sigma_{v'v}^2],$$

where $\mu_{v'v}$ and $\sigma_{v'v}$ denote the mean and variance of the time to traverse the arc (v', v).

Because the distributions representing the travel times are independent, the variance of each path is given by the sum of variances of the arcs. Hence, suboptimality holds. The path with a smallest variance from the source S to node v through node v' uses a path with a smallest variance from S to node v'. We find the path from the source S to destination T by taking a minimum of $(t-m)^2+\Phi(T, m)$ over all m=0, ..., M. This path is optimal for the given starting time.

Figure 4:
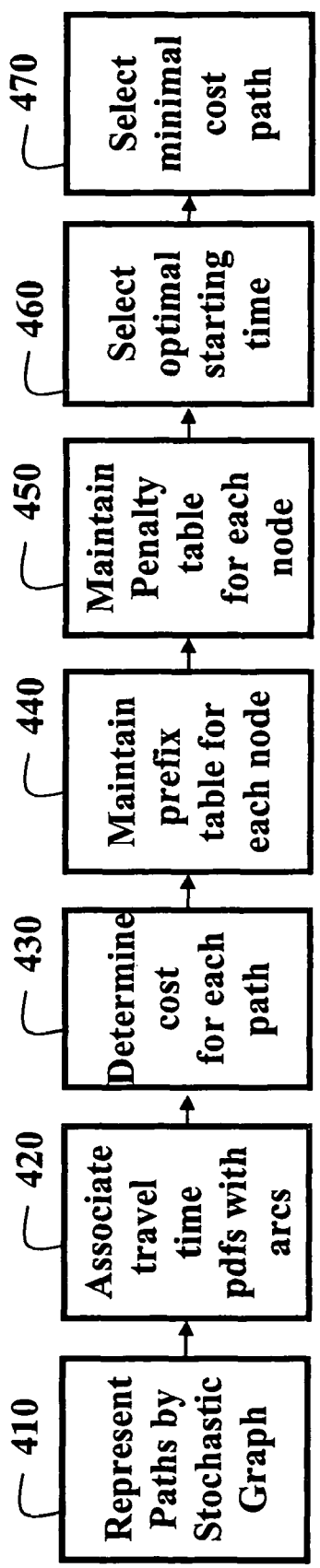
FIG. 4 is a flow diagram of the method of FIG. 3.

FIG. 3 shows the pseudo code for the method in FIG. 4.

As described above, we represent 410 possible paths from a source to a destination by a stochastic graph of nodes connected by arcs. With each arc in the graph, we associated 420 an independent probability distribution function (pdf) representing a time to traverse the arc.

For each node, we determine 430 a minimal expected cost to reach the node. The minimal cost is a sum of the travel times to reach the node. The minimal cost is in terms of the nonlinear cost function. For each node, we maintain 440 a table a multi-dimensional prefix table. The prefix table indicates all predecessor nodes on the minimal cost paths to reach the node. That is, the table indicates minimal expected penalty subpaths to the node. The table also stores a expected penalty for each minimal expected penalty subpath. The prefix table is indexed by discretized values of the nonlinear cost function.

We also maintain 450 a penalty table for the path to each node. Then, we select 460, using the prefix tables, a minimal cost path from the source to the destination; and using the penalty tables, we also select 470 an optimal starting time. The optimal starting time corresponds to a minimum of the nonlinear cost function for the minimal cost path.

Quadratic Plus Exponential Costs

Similarly, we can solve the case of the quadratic cost function plus an exponential penalty term. In this case, our dynamic programming table has an extra dimension for possible values of the variance of a path. Each table entry contains the path of a specific mean and specific variance that has a smallest exponential term.

General Polynomial plus Exponential Costs

The above dynamic programming algorithms extend to the case when the expected cost is a general polynomial function plus exponential with a constant number of terms. Because it is not clear how the various terms affect each other, we keep track of each term individually in a separate dimension of the dynamic programming table.

For general polynomial (plus exponential) cost functions and additive arc distributions, the expected cost of the travel time Y of the entire path depends only on the distribution of Y, as opposed to the travel time of each individual arc on the path. For example, when the cost C(Y) is a polynomial of degree z, the expected cost E[C(Y)] is a linear combination of the first z moments of the random variable Y.

Monotone Increasing Costs

The minimal cast path problem becomes significantly easier when we consider some natural monotone increasing costs, such as linear and exponential cost, for which the global cost is separable into costs for each arc. As noted above, linear cost, with a given starting time, translates to minimizing the expected travel time. An exponential cost $C(t)=e^{kt}$ gives rise to the expected path cost $$ECp(t) = e^{kt}\prod_{e \in P} E[e^{kY_e}]$$

We make this separable operating in the logarithmic domain, where finding the path with a lowest expected cost, starting from the source at time t, is equivalent to finding the minimal cost path on the same graph with arc weights set to a cumulant-generating function $K(k)=\log(E[e^{kY_e}])$ The cumulant-generating function is a series sum over cumulants that is dominated by the lowest central moments of the distribution. For many distributions, the cumulant-generating function is effectively a weighted sum of the means and variances.

For gamma distributed travel times, $K(k)=a \log(1/(1-kb))$, and for normally distributed variables $K(k)=k\mu+k^2\sigma^2/2$.

EFFECT OF THE INVENTION

The invention provides a method for route planning under uncertainty in a decision theoretic model: planning a minimal cost path for a given starting time as well as planning an optimal starting time for a minimal cost path. The path and starting time are jointly optimized because there are penalties for both late and early arrivals.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for finding a path having a minimal expected cost, in which the path is through a network of nodes, in which the path is from a source node to a destination node, and in which the path includes one or more subpaths, comprising the steps of:
   representing the network in a memory as a stochastic graph of nodes connected by arcs, in which a travel time for traversing each arc is a random variable expressing a probability of the travel time;
   representing, in the stochastic graph in the memory, a cost of a traversing each subpath in the path from the source node to the destination node as a nonlinear cost function of a total travel time on the path;
   determining, for particular subpath, an expected cost function as a weighted average of the nonlinear cost function over all possible traversal times according to the probabilities on the subpath, in which the expected cost function determines an expected cost for the subpath; and
   determining for each node in the network and for each possible time to start, an optimal path from the source node to the node having a minimal expected cost and an optimal time to start on the optimal path, wherein the steps are performed in a computer system.

2. The method of claim 1, in which the expected cost function is a convolution of the nonlinear cost function with probability distribution functions of the random variables.

3. The method of claim 1, further comprising:
   maintaining, for each node and the optimal path to the node, the expected cost according to sets of values obtained from a subset of terms of the expected cost function.

4. The method of claim 3, further comprising:
   discretizing the values of terms of the expected cost function.

5. The method of claim 1 in which travel time represents an arbitrary resource, and the expected cost function represents a penalty for expending the arbitrary resource.

6. The method of claim 2, in which the nonlinear cost function is a quadratic function augmented with an exponential term.

7. The method of claim 1, in which the network is a transportation network.

8. The method of claim 1, in which the network is a communications network.

9. The method of claim 1, in which each possible total travel time is expressed as a probability distribution function.

* * * * *